United States Patent [19]

Heafner

[11] Patent Number: 5,207,744
[45] Date of Patent: May 4, 1993

[54] THERMOSTAT APPARATUS

[76] Inventor: Morris T. Heafner, P.O. Box 55, High Shoals, N.C. 28077

[21] Appl. No.: 859,938

[22] Filed: Mar. 30, 1992

[51] Int. Cl.$^5$ .................................................. F01P 7/16
[52] U.S. Cl. .............................. 236/34.5; 236/DIG. 2
[58] Field of Search ............ 236/DIG. 2, 34.5, 101 D, 236/34

[56]  References Cited

U.S. PATENT DOCUMENTS

| | | | |
|---|---|---|---|
| 3,715,894 | 2/1973 | Widdowson | 236/101 D X |
| 3,776,457 | 12/1973 | Cardi | 236/34.5 |
| 4,011,988 | 3/1977 | Inagaki | 236/34.5 |
| 4,353,501 | 10/1982 | Brown | 236/34.5 |
| 4,981,260 | 1/1991 | Beiser | 236/DIG. 2 |

Primary Examiner—William E. Tapolcai
Attorney, Agent, or Firm—Leon Gilden

[57]  ABSTRACT

A thermostat including a central and primary bi-metallic member further includes a mounting flange, with the mounting flange including a plurality of apertures directed therethrough to permit coolant flow therethrough in the event of failure of the primary bi-metallic member. A modification of the invention includes each by-pass aperture including bi-metallic valving, wherein each bi-metallic valve of the bi-metallic valving of each respective aperture is arranged at a varying temperature gradient to permit increased by-pass coolant flow dependent upon operating temperature of the coolant.

2 Claims, 4 Drawing Sheets

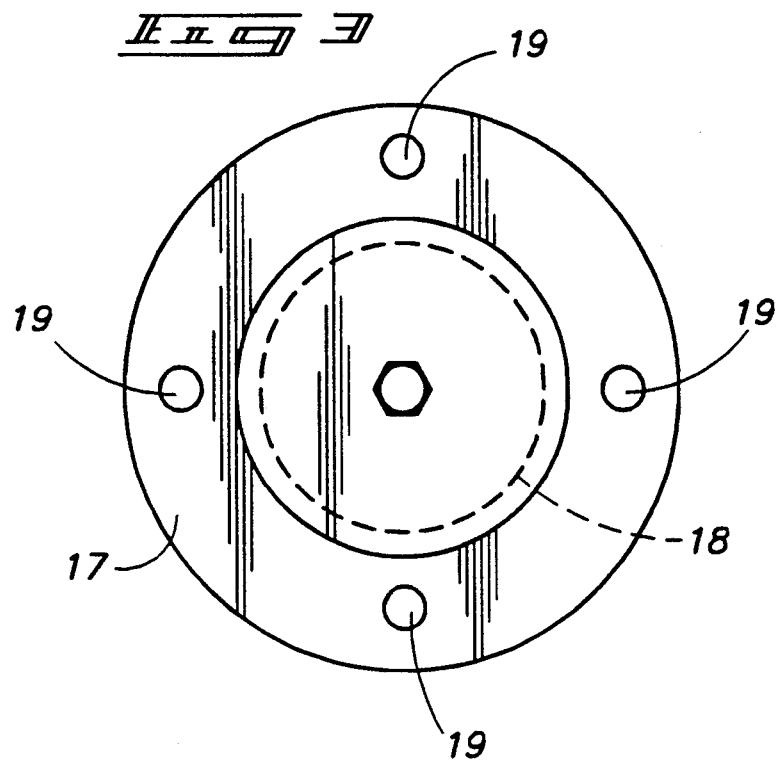
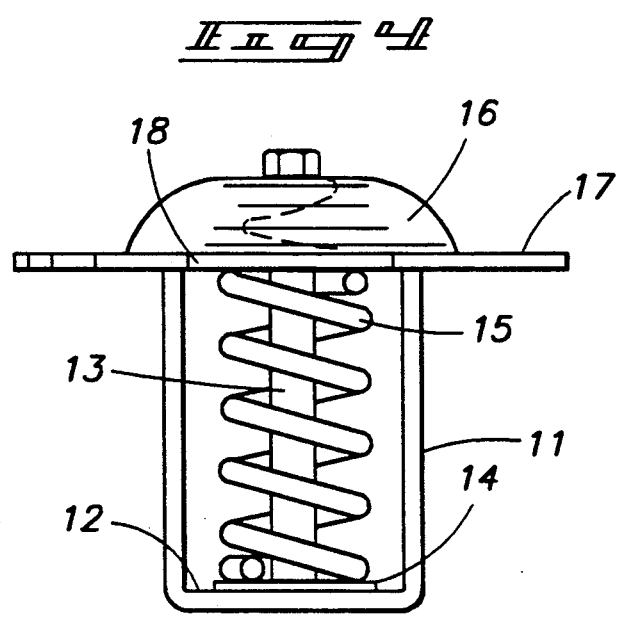

5,207,744

THERMOSTAT APPARATUS

BACKGROUND OF THE INVENTION

1. Field of the Invention

The field of invention relates to thermostat apparatus, and more particularly pertains to a new and improved thermostat apparatus wherein the same is arranged to include a by-pass system for permitting coolant flow in concert with and in the event of failure of the primary coolant flow system.

2. Description of the Prior Art

Various thermostat apparatus is utilized in the prior art and particularly in use of automotive environments. Due to contamination, age, and the like, thermostat members utilized in a water-cooled internal combustion engine system will fail and in that event, a backup system is desirable to prevent and minimize engine failure. A fail-safe system arranged in association with the primary thermostatic device is set forth in U.S. Pat. No. 4,469,275 to Desalve.

U.S. Pat. No. 2,013,424 to Rippe sets forth a thermostat valve structure of conventional construction utilized in the prior art coolant flow delivery system of an internal combustion engine.

U.S. Pat. No. 4,399,775 to Tanaka, et al. including a by-pass system in a solenoid operated valve for actuating by-pass system in controlling coolant water temperature.

As such, it may be appreciated that there continues to be a need for a new and improved thermostat apparatus as set forth by the instant invention which addresses both the problems of ease of use as well as effectiveness in construction in providing a by-pass organization permitting fluid flow during failure of a primary system and in this respect, the present invention substantially fulfills this need.

SUMMARY OF THE INVENTION

In view of the foregoing disadvantages inherent in the known types of thermostat apparatus now present in the prior art, the present invention provides a thermostat apparatus wherein the same includes a by-pass system of coolant flow in association with a primary thermostat system. As such, the general purpose of the present invention, which will be described subsequently in greater detail, is to provide a new and improved thermostat apparatus which has all the advantages of the prior art thermostat apparatus and none of the disadvantages.

To attain this, the present invention provides a thermostat including a central and primary bi-metallic member and further including a plurality of apertures directed therethrough to permit coolant flow therethrough in the event of failure of the primary bi-metallic member. A modification of the invention includes each by-pass aperture including bi-metallic valving, wherein each bi-metallic valve of the bi-metallic valving of each respective aperture is arranged at a varying temperature gradient to permit increased by-pass coolant flow dependent upon operating temperature of the coolant.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved thermostat apparatus which has all the advantages of the prior art thermostat apparatus and none of the disadvantages.

It is another object of the present invention to provide a new and improved thermostat apparatus which may be easily and efficiently manufactured and marketed.

It is a further object of the present invention to provide a new and improved thermostat apparatus which is of a durable and reliable construction.

An even further object of the present invention is to provide a new and improved thermostat apparatus which is susceptible of a low cost of manufacture with regard to both materials and labor, and which accordingly is then susceptible of low prices of sale to the consuming public, thereby making such thermostat apparatus economically available to the buying public.

Still yet another object of the present invention is to provide a new and improved thermostat apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic top view of the instant invention.

FIG. 4 is an orthographic side view of the instant invention.

DESCRIPTION OF THE PREFERRED EMBODIMENT

Figure 1:
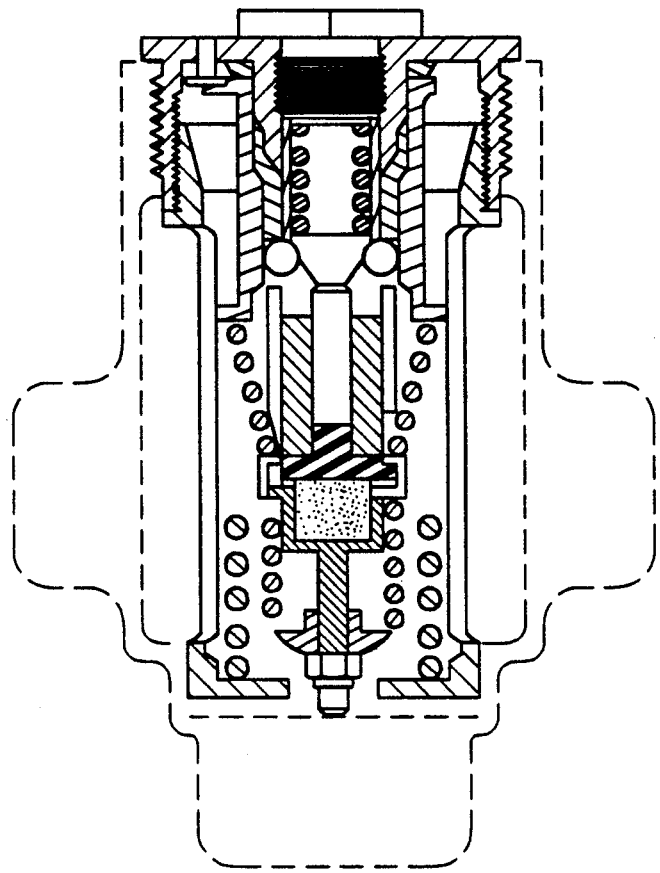
FIG. 1 is an orthographic cross-sectional illustration of a prior art thermostat apparatus.
Figure 2:
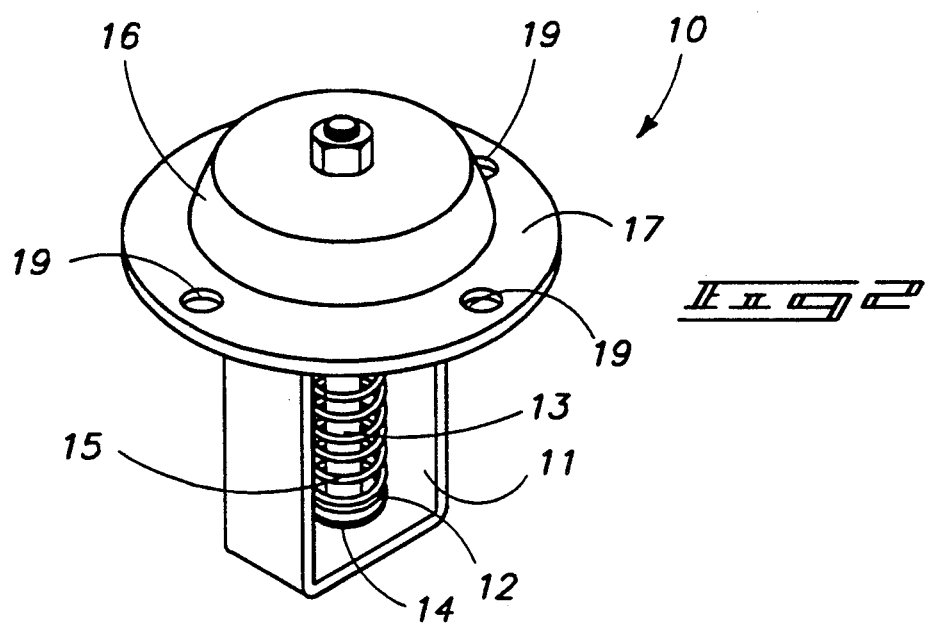
FIG. 2 is an isometric illustration of the instant invention.

With reference now to the drawings, and in particular to FIGS. 1 to 9 thereof, a new and improved thermostat apparatus embodying the principles and concepts of the present invention and generally designated by the reference numerals 10, 10a, and 10b will be described.

FIG. 1 illustrates a prior art thermostat apparatus utilizing a fail-safe system, as set forth in U.S. Pat. No. 4,469,275, utilizing a back-up system in the event of the primary by-pass system.

More specifically, the thermostat apparatus 10 of the instant invention essentially comprises a support housing 11, including a housing floor 12. An actuator rod 13 includes a rod plate 14 removably mounting a lower terminal end thereof with the rod plate fixed to a top surface of the floor 12. An upper distal end of the rod 13 has an inverted cap member secured thereto. A bi-metallic spring 15 is wound about the rod 13 with the upper end of the spring 15 fixedly secured to the valve cap 16 and a lower end of the spring 15 secured to the rod plate 14. The valve cap 16 is mounted to a top surface of a flange 17, that in turn is secured orthogonally to upper distal ends of the support housing 11 and parallel to the housing floor 12. The flange 17 is formed with a central flange opening 18 directed therethrough. The central flange opening is typically covered by the valve cap 16, in a manner as illustrated in the FIGS. 3 and 4, not subject to elevated fluid temperatures having the bi-metallic spring 15 biasing the valve cap 16 onto the top surface of the flange 17 to cover the flange opening 18. When subject to elevated temperatures, the bi-metallic spring 15 extends to separate the actuator rod 13 from the rod plate 14 and as the upper end of the spring 15 is secured to the cap 16, effects a lifting of the cap 16 relative to the flange 17.

To augment the coolant flow in the event of failure of the bi-metallic rod plate 14, a plurality of by-pass openings 19 are directed through the mounting flange 17 to permit coolant flow to be directed therethrough and thereby allow a circulatory motion of coolant through the cooling system of a typical internal combustion engine water jacket system for example minimizing and preventing engine damage.

Figure 5:
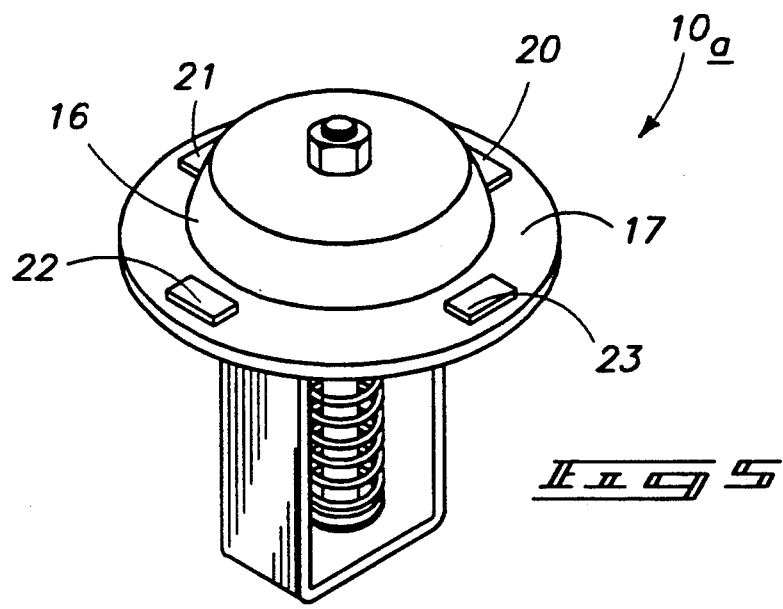
FIG. 5 is an isometric illustration of a modification of the invention.
Figure 6:
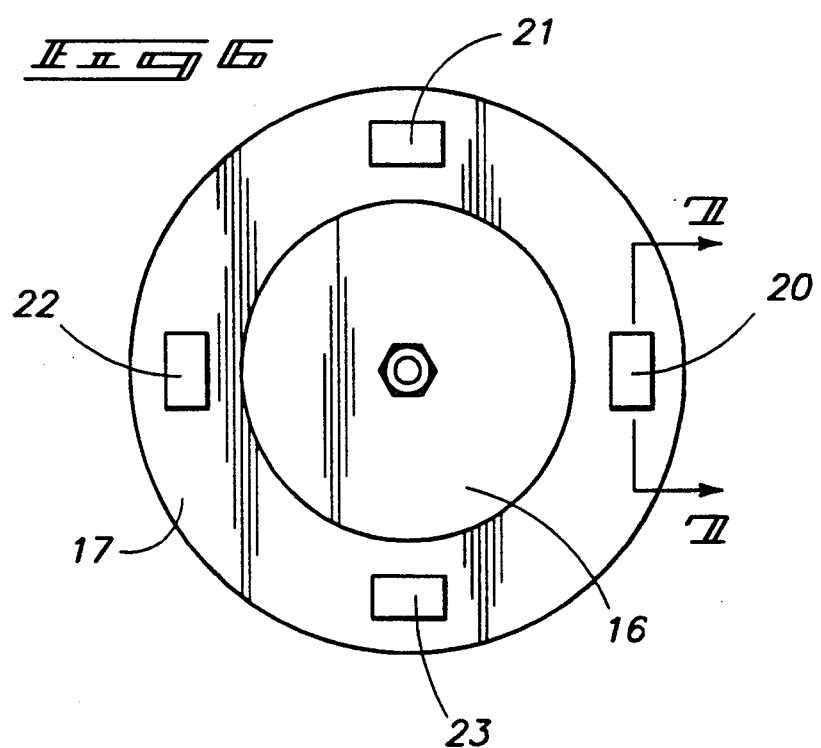
FIG. 6 is an orthographic top view of the invention, as set forth in FIG. 5.
Figure 7:
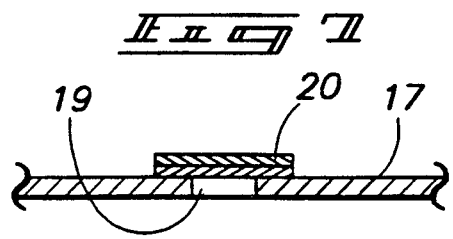
FIG. 7 is an orthographic view, taken along the lines 7—7 of FIG. 6 in the direction indicated by the arrows.

FIG. 5 illustrates a modified apparatus 10a, wherein each by-pass opening 19 includes a respective first, second, third, and fourth bi-metallic covering plate 20, 21, 22, and 23 respectively positioned in a covering relationship relative to the by-pass openings 19. The first bi-metallic covering plate 20 is operative at a first temperature, the second bi-metallic covering plate is operative at a second temperature, the third bi-metallic covering plate is operative at a third temperature, and the fourth bi-metallic covering plate is operative at a fourth temperature, wherein operative is defined to separate and provide a spacing between the flange 17 and the associated covering plate 20-23 permitting coolant flow through each associated and respective by-pass opening 19. It should be noted that first temperature is less than the second temperature, and the second temperature less than the third temperature, with the third temperature less than the fourth temperature. In this manner, gradient flow is sequentially directed through the respective openings 19 as required to minimize by-pass flow until such by-pass flow is required due to elevating temperatures within an associated coolant in confrontation with the apparatus 10a.

Figure 8:
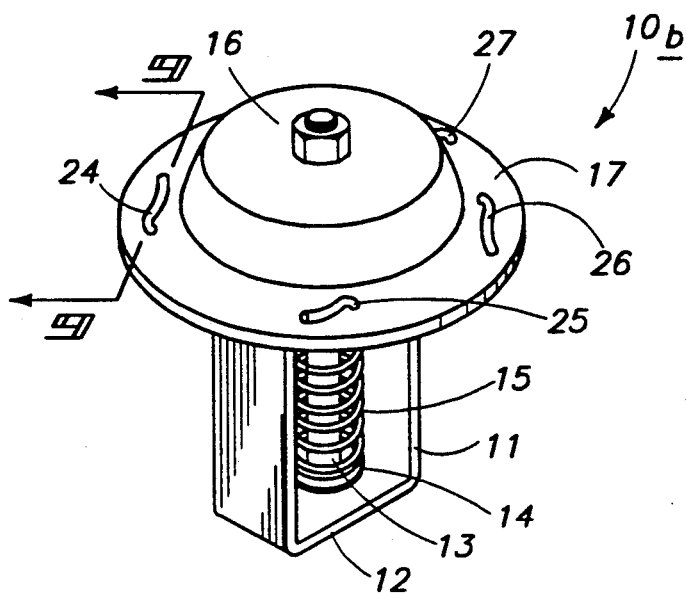
FIG. 8 is an isometric illustration of a further modification of the invention.
Figure 9:
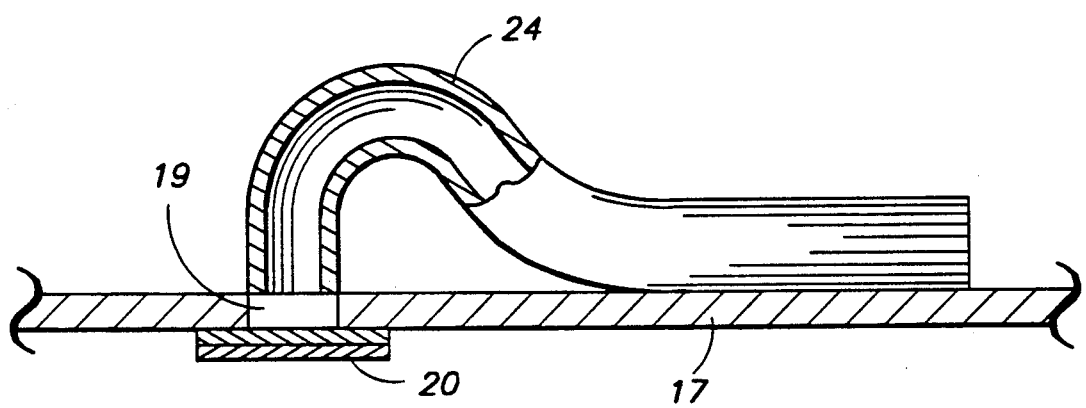
FIG. 9 is an orthographic view, taken along the lines 9—9 of FIG. 8 in the direction indicated by the arrows.

The apparatus 10b, as illustrated in FIGS. 8 and 9, in addition to the first through fourth bi-metallic covering plates 20-23, include a respective first through fourth cooling tube 24-27 inclusively, wherein a lower terminal end of each cooling tube is in fluid communication with an associated by-pass opening 19, with a forward or free end of the cooling tube contiguously mounted to the top surface of the flange 17 to direct the cooling fluid about the top surface of the flange 17 to enhance equalizing temperatures below and above the flange 17 to ensure proper opening of the respective covering plates 20-23 as required in association with respective first through fourth cooling tubes 24-27.

As to the manner of usage and operation of the instant invention, the same should be apparent from the above disclosure, and accordingly no further discussion relative to the manner of usage and operation of the instant invention shall be provided.

With respect to the above description the, it is to be realized that the optimum dimensional relationships for the parts of the invention, to include variations in size, materials, shape, from, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A thermostat apparatus, comprising in combination, a support housing, the support housing including a floor, and the support housing including a mounting flange mounted fixedly to an upper terminal end of the support housing in a spaced parallel relationship relative to the floor, with the mounting flange including a central flange opening, and a valve cap mounted above the mounting flange, with the valve cap including a rod coaxially directed through the central flange opening, and the rod including a rod plate fixedly and orthogonally mounted to a lower terminal end of the rod, the rod plate including a bi-metallic spring captured between the rod plate and a bottom surface of the mounting flange, and a plurality of by-pass openings directed through the mounting flange in a spaced relationship relative to one another, wherein the spaced relationship defines an equal predetermined spacing between adjacent by-pass openings, and wherein the by-pass openings include at least a first by-pass opening, a second by-pass opening, and a third by-pass opening, the first by-pass opening including a first by-metallic covering plate positioned over the first by-pass opening, a second bi-metallic covering plate positioned to overlie the second by-pass opening, and a third bi-metallic covering plate positioned to overlie the third by-pass opening; wherein the first bi-metallic covering plate is arranged to deflect relative to the mounting flange at a first temperature, the second bi-metallic covering plate is arranged to deflect at a second temperature, the third by-pass covering plate is arranged to deflect a third temperature, wherein the first temperature is greater than the second temperature and the second temperature is greater than the third temperature.

2. An apparatus as set forth in claim 1 wherein the first by-pass opening includes a first cooling tube in fluid communication with the first opening, and a second cooling tube mounted to the second by-pass opening in fluid communication with the second by-pass opening, and a third by-pass opening includes a third cooling tube in fluid communication with the third by-pass opening, wherein each cooling tube includes a forward free end spaced from each respective by-pass opening, wherein each free end is positioned in contiguous communication with a top surface of the mounting flange to direct coolant to a top surface of the mounting flange and stabilize a gradient temperature between a bottom surface of the mounting flange and the top surface of the mounting flange.

* * * * *